United States Patent
Weng

(10) Patent No.: US 6,909,622 B2
(45) Date of Patent: Jun. 21, 2005

(54) QUASI ACTIVE POWER FACTOR CORRECTION CIRCUIT FOR SWITCHING POWER SUPPLY

(76) Inventor: Da Feng Weng, 20689 Park Cir. West #4, Cupertino, CA (US)

( * ) Notice: Subject to any disclaimer, the term of this patent is extended or adjusted under 35 U.S.C. 154(b) by 0 days.

(21) Appl. No.: 10/287,828

(22) Filed: Nov. 5, 2002

(65) Prior Publication Data

US 2004/0085788 A1 May 6, 2004

(51) Int. Cl.[7] ............................................... H02M 7/06
(52) U.S. Cl. ......................................... 363/126; 363/37
(58) Field of Search ........................... 323/207; 363/34, 363/37, 89, 126

(56) References Cited

U.S. PATENT DOCUMENTS

| | | | | |
|---|---|---|---|---|
| 3,913,002 A | * | 10/1975 | Steigerwood et al. | ......... 363/18 |
| 5,654,882 A | * | 8/1997 | Kanazawa et al. | ............ 363/37 |
| 6,023,037 A | * | 2/2000 | Church et al. | ......... 219/121.39 |
| 6,038,146 A | * | 3/2000 | Luo et al. | ................ 363/21.16 |
| 6,108,222 A | * | 8/2000 | Liang | ........................... 363/48 |
| 6,373,728 B1 | * | 4/2002 | Aarestrup | ..................... 363/37 |
| 6,621,236 B1 | * | 9/2003 | Kisaichi | ..................... 315/224 |
| 6,661,684 B2 | * | 12/2003 | Morita | ......................... 363/89 |

* cited by examiner

*Primary Examiner*—Jeffrey Sterrett
(74) *Attorney, Agent, or Firm*—Fortune Law Group; Douglas E. Mackenzie

(57) ABSTRACT

A switching power supply AC-DC-DC or AC-DC-AC with power factor corrector function is provided. The switching power supply circuit includes a quasi active shaping function that shapes an input current of a power line. In the whole system, the active switch or switches are only used to control the output power and no more current stress on the active switch or switches. It is possible to minimize the whole system size.

11 Claims, 17 Drawing Sheets

Power Factor Correction

Power Factor Correction

QUASI ACTIVE POWER FACTOR CORRECTION CIRCUIT FOR SWITCHING POWER SUPPLY

BACKGROUND OF THE INVENTION

1. Field of the Invention

The present invention is relative to single phase AC to DC converter with power factor correction function (so that the power factor of the input current is at a power factor in excess of that of an otherwise comparable low-power-factor converter design). It can be used on in switching mode power supply and electronics ballast.

2. Description of the Prior Art

The demand for and development of power factor correction (PFC) circuit has been fueled by a concern over the massive use of electronics power converter, such as, AC-DC-DC, AC-DC-AC employed in switching mode power supply system. Due to cost and efficiency consideration, it is desirable to employ a simple PFC circuit and increase the efficiency of the whole system.

PFC circuits are classified into two groups. First group is defined as active PFC circuits, and second group is defined as passive PFC circuits. The very popular Boost-type PFC circuit is an active PFC circuit. It can shape the input current and make the total harmonic distortion (THD) very low. However, the efficiency of the active PFC circuit is lower than one of passive PFC circuit, due to extra switching circuit. Further, the control of the active PFC is complicated, resulting in increased manufacturing cost and reduced reliability of the circuit. For passive PFC circuit, due to no active control switch in the circuit, the passive PFC can work in higher efficiency, but THD of the passive PFC is higher and size of the passive components is big.

Based on the advantage and disadvantage of two groups PFC circuits, the concept of single power stage converter with PFC was presented for several years. In the converter, some extra passive components are added to a regular converter. The extra components are working in the converter's switching frequency. The size of the extra component is small due to higher operating switching frequency. In this kind of converter, the main task of the active switch of the converter is to regulate the output power. The active switch involves a part of task to shape the input current. Due to both input and output current controlled by the active switch, the loss on the active switch is higher and the efficiency of the whole system is lower.

Based on the existed PFC circuits, there are a lot of papers and patents about valley-fill circuit. The basic valley-fill circuit is shown in FIG. 1. Valley-fill circuit can provide better performance than other passive types of PFC circuits.

In the valley-fill circuit, the power line directly feeds energy (e.g. electrical energy) to the load through the rectifier diodes for approximately 120 degrees around the peek voltage. Two storage capacitors C1 and C2 feed energy to the load through diodes D1 and D2 for approximately 60 degrees near the zero line crossing points. Most of the input energy being first fed to the load, with a small portion of the input energy being first fed to the two storage capacitors C1 and C2, and then fed to the load through capacitors C1 and C2. As a result, such a circuit offers a relatively high operating efficiency.

Problems with the valley-fill circuit are a pulsating line current charges the capacitors near the peak power line voltage, resulting in a deteriorated PF (of about 0.95) and a high THD (e.g. about 40%). The output of the valley-fill circuit exhibits a large ripple from the half of the power line peak voltage to the power line peak voltage, with the ripple frequency being equal to twice the line frequency.

A great deal of the time and effort has been spent in attempts to improve the PFC performance of the valley-fill circuit. This work has been directed to shaping the input current during the approximate 60 degree dead time near the zero line crossing points, and to limiting the pulsating line current that charges the capacitors near the peak line voltage.

A paper titled "A Unity Power Factor Electronic Ballast for Fluorescent Lamp Having Improved Valley Fill and Valley Boost Converter" from Conference Record PESC'97, describes the use of an active boost circuit to shape the input current during the approximate 60 degree dead time near the zero line crossing points, as shown in FIG. 3. Because a boost switch still suffers the peak input voltage and the switch only works during the 60 degree dead time, as shown in FIG. 4, a complex control method is required to detect the operating point. In addition, the complexity of the circuit decreases the reliability and increases the total manufacturing cost.

Japanese Pat. No. HEI 8-205520 illustrated in FIG. 5, describes the load current of a PFC converter as being discontinues, and discloses that the insertion of a suitable inductor L1 in the input power line avoids pulsating of the power line current. Because an instantaneous line voltage is higher than the voltage of each DC bulk capacitor C1 and C2, while being less than the sum of the voltages of the two capacitors, the inserted inductor provides a boost function to boost the sum of the voltage of the two capacitors. However, this disclosure fails to solve the above-described problem that exists at the input current during the approximate 60 degree dead time near the zero line crossing points.

U.S. Pat. No. 5,986,901 illustrated in FIG. 6, discloses the use of the high frequency discontinues input current of the converter to drive a charge pump circuit Z and the inserted input inductor. As shown in FIG. 6, the charge pump circuit shapes the input current during the approximate 60 degree dead time, and the input inductor provides a boost function to boost the sum of the voltage of the two capacitors. Because the charge pump circuit and the inserted input inductor are driven with the discontinues input current automatically, the active switch or switches in the converter would not be exposed to extra current or voltage stresses. However, the disclosure needs several passive components to implement the charge pump circuit. The cost of the disclosure is still high.

SUMMARY OF THE INVENTION

Accordingly, the present invention is based on a valley-flit circuit, but the 60 degree dead time and the pulsating current of the valley-fill PFC circuit are eliminated, while maintaining a high operating efficiency. According to the instant invention, a driving source of an auxiliary PFC circuit, such as, for example, a coupled inductor circuit, is coupled from at least one leg of a valley-fill PFC circuit, so as to shape the input current during the approximate 60 degree dead time near the zero line crossing points. In addition, the coupled inductor circuit, is employed to reduce (or eliminate) the power line's pulsating line current and to help boost performance of the auxiliary PFC circuit.

The present invention enables one to avoid the use of active switch and control circuit for a PFC while keeping the advantages of a passive PFC circuit; namely, high efficiency, resulting in a lowered manufacturing cost. The PFC function automatically acts when the line voltage is less than the voltage on a pair of the storage capacitors.

According to the present invention, a power factor correction circuit is disclosed and includes a system that shapes an input current of a power line during a predetermined period proximate a zero line crossing point of the input voltage, and a system that minimizes a pulsating of the input current. According to an advantage of the instant invention, an output of the power factor correction circuit is provided to a discontinuous power source, such as, for example, a discontinuous current load that is suitable for most power converter circuits as a following power stage, a discontinuous current input buck converter, a discontinuous current input full bridge converter, a discontinuous current input full bridge converter, a discontinuous current input half bridge converter, a discontinuous current input half bridge inverter, or a discontinuous current input buck-boost converter, a discontinuous current input flyback converter.

According to an advantage of this invention, the coupled inductor circuit comprises a multi-winding coupled inductor on one magnetic core. One winding of the coupled inductor is connected between the output of the rectifier of the valley-fill PFC converter and the output load of the valley-fill PFC converter. At least a second winding of the coupled inductor is connected to at least one DC bulk storage capacitance device of the valley-fill PFC converter. In this way, the current released from the DC bulk storage capacitance device of the valley-fill PFC converter can be stored in magnetic energy in the coupled inductor and as the output load current of the valley-fill PFC converter is zero, that is, discontinuous, the energy stored in the coupled inductor will release to the two DC bulk storage capacitance devices of the valley-fill PFC converter and other energy storage device through the rectifier and input AC line of the valley-fill PFC converter during the approximate 60 degree dead time.

According to an object of the instant invention, a switching power supply is disclosed having an AC-to-DC converting device that converts an AC input line voltage to a DC voltage, an energy storage device (such as, for example, a valley-fill circuit and other energy storage device) that stores electrical energy in which the stored energy is released to a load during a predetermined period of the AC input line voltage, and an auxiliary power factor corrector that operates, after a release of the electrical energy (such as, for example, a high frequency discontinuous current), stored in the energy storage device, to shape the AC input line current during the predetermined period. The predetermined period comprises a period proximate a zero voltage crossing of the AC input voltage.

According to an advantage of the instant invention, a device which limits the current slew rate is provided that limits a current input slew rate of the AC-DC converter device.

According to another advantage of the present invention, the current slew rate limiting device comprises an electromotive force generator, such as, for example, the couple inductors.

DETAILED DESCRIPTION OF THE INVENTION

Figure 1:
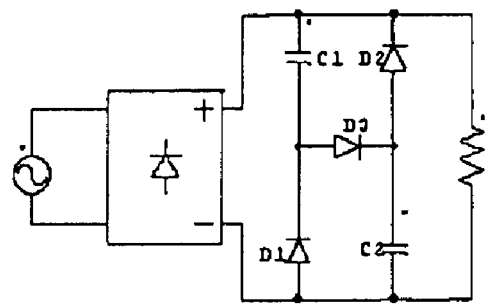
FIG. 1 illustrates a conventional basic valley-fill power factor correction circuit.
Figure 2:
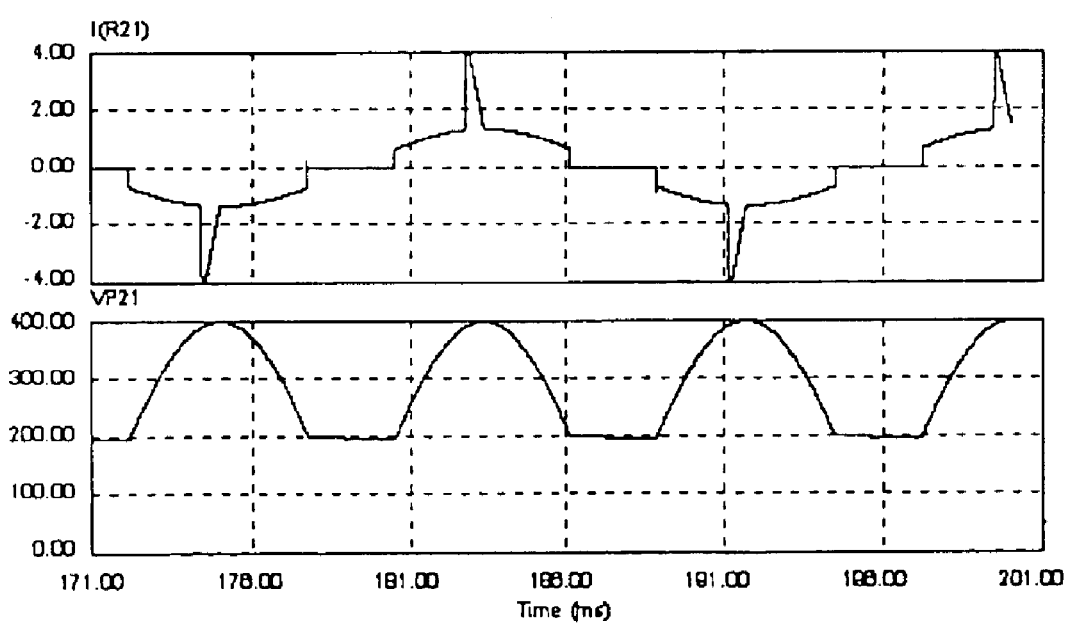
FIG. 2 illustrates electrical waveforms of an input current and an output voltage of the valley-fill power factor correction circuit of FIG. 1.
Figure 3:
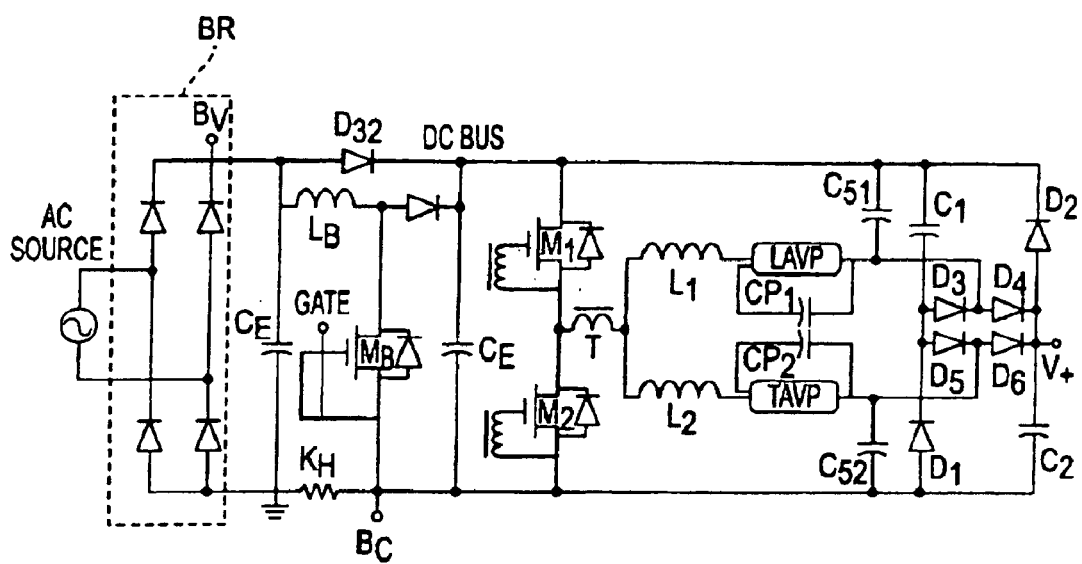
FIG. 3 illustrates a prior art valley-fill power factor correction circuit AC-DC-AC converter that employs an active boost circuit to shape an input current during a 60 degree dead time proximate a zero line crossing.
Figure 4:
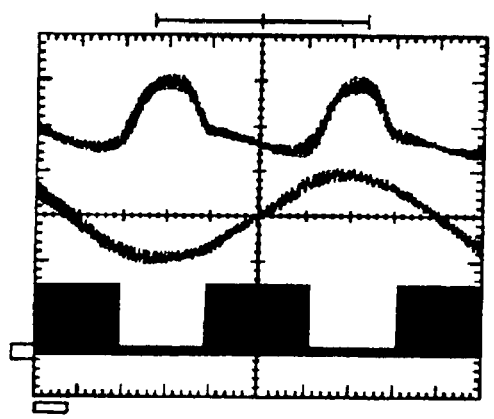
FIG. 4 illustrates electrical waveforms produced by the valley-fill power factor correction circuit of FIG. 3, in which the top waveform represents a DC bulk voltage, the middle waveform represents an input current, and the bottom waveform represents a switch driving signal.
Figure 5:
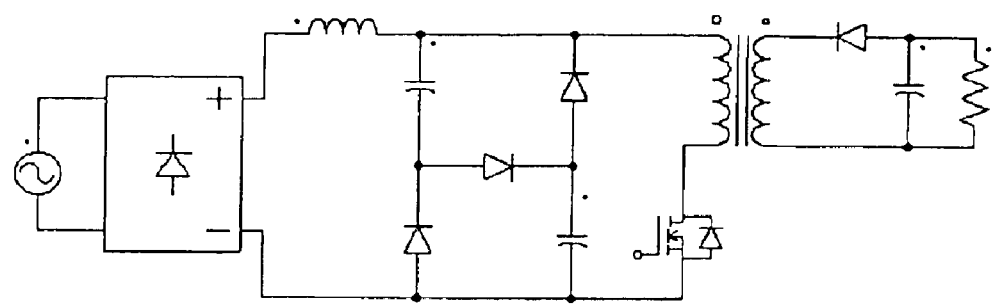
FIG. 5 illustrates a prior art valley-fill power factor correction circuit employing an input electromotive force generating device to avoid pulsating of the power line current.
Figure 6:
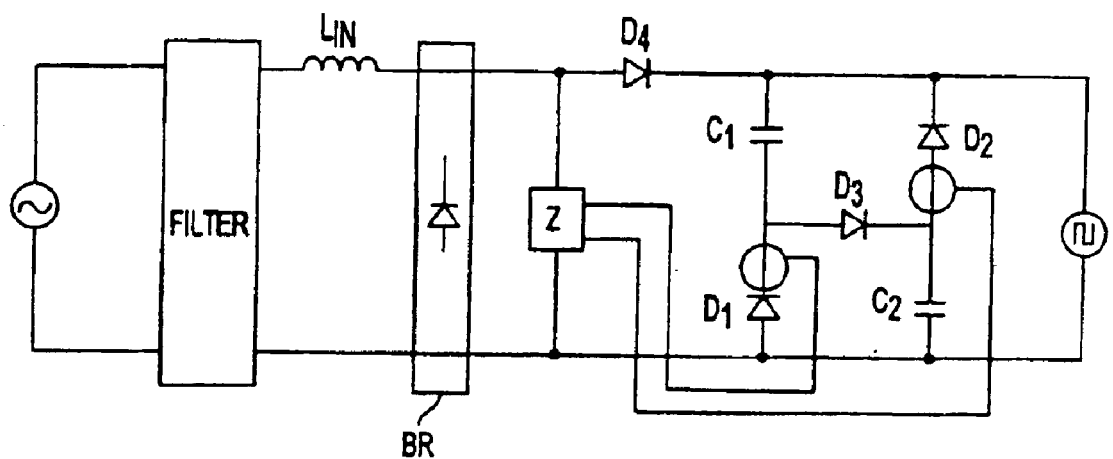
FIG. 6 illustrates a block diagram of prior art valley-fill power factor correction circuit employing a charge pump circuit to shape an input current during a 60 degree dead time proximate a zero line crossing and avoid pulsating of the power line current.
Figure 7:
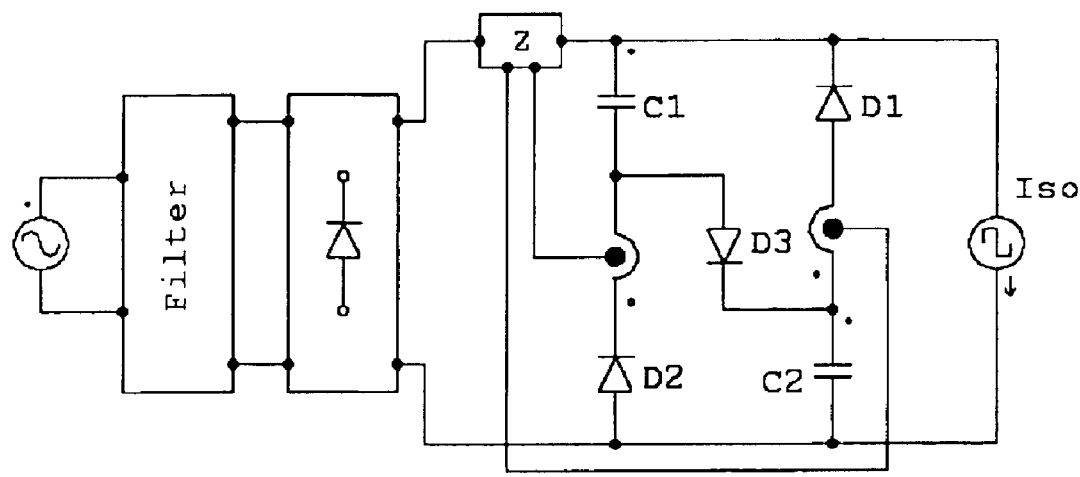
FIG. 7 illustrates a block diagram of quasi active power factor correction AC-DC converter according to a preferred embodiment of the instant invention.

The present invention discloses a passive PFC circuit that exhibits a high operating frequency. A block diagram of a preferred embodiment is shown in FIG. 7. As shown in the drawing, a driving source of an auxiliary PFC circuit Z such as, for example, a coupled inductor is coupled to at least one leg of the valley-fill circuit to shape the input current during the 60 degree dead time near the zero crossing points. Thus, the present invention, in its most basic form, overcomes the above noted problems of the prior art; namely, the existence of the approximate 60 degree dead time and the pulsating current of valley-fill PFC circuits as well as more complicated circuits.

As shown in FIG. 7, the load of PFC converter comprises a discontinues current source that exhibits a minimum dead time. During the dead time, the load current is zero or negative. The auxiliary PFC's driving source is coupled from at least one leg of the valley-fill circuit. The leg (or legs) is (are) composed of a pair of diodes and a pair of DC bulk capacitors. In the preferred embodiment, the driving source couple from the legs is a high frequency unipolar current source due to the series diodes.

Figure 8:
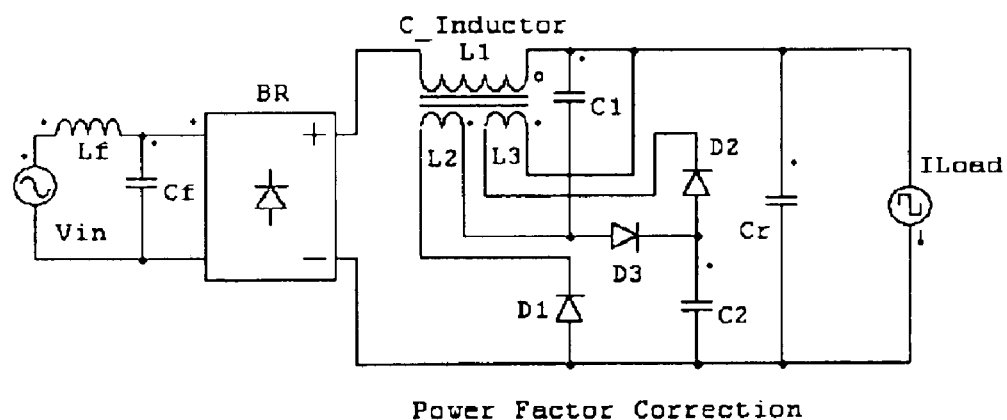
FIG. 8 illustrates an electrical circuit diagram of a single phase high power factor correction converter with discontinues current load according to the preferred embodiment of the present invention.

FIG. 8 illustrates a circuit of the preferred embodiment of the present invention. As shown in FIG. 8, the preferred embodiment of the present invention comprises a differential filter made up of inductor Lf and capacitor Cf, a bridge rectifier BR, an inserted electromotive force generating device (such as, for example, a coupled inductor C_Inductor with three windings L1, L2 and L3), three valley-fill diodes D1, D2 and D3, two DC bulk capacitors C1 and C2, a resonant capacitor Cr and a discontinuous Power source, such as, for example, a buck, a buck-boost, a forward, a flyback, a resonant inverter circuit, or any other equivalent discontinuous power load.

The auxiliary PFC circuit comprises the coupled inductor with three windings. The coupled inductor's windings couple the driving source from the legs of the valley-fill circuit to shape the input current through the coupled inductor's magnetic field. The coupled inductor is also used to limit (minimize) the slew rate of the pulsating current and to server as a boost function to help PFC performance.

It is noted that the discontinues power (current) load is generated by the switching converter, such as, for example, a buck converter, a buck-boost converter, a flyback converter, a forward converter, a resonant converter, or any other type of switching converter.

The operation of the preferred embodiment will be described with respect to two working (operating) modes; a direct feed mode (corresponding to a situation in which an instantaneous input line voltage is higher than the voltage of each DC bulk capacitor C1 and C2), and a couple boost mode (corresponding to a situation in which an instantaneous input line voltage is lower than the voltage of each DC bulk capacitor C1 and C2).

The following discussion will be based on an input AC voltage during a positive period. The operation during a negative period is basically the same.

1. Direct Feed Mode:

For the direct feed mode, the output voltage of the rectifier bridge is higher than the voltage on each DC bulk capacitors C1 and C2, but less than the sum of voltage on each DC bulk capacitors C1 and C2. As the PFC's load current is changed from zero to a fixed value, the input line will directly feed the energy to the load and the resonant capacitor Cr through C_inductor's winding L1 and the rectifier. Because the load current passes through L1 and the bridge rectifier BR, there is energy stored in L1. As the load current is changed from the fixed value down to zero, the energy stored in L1 will release to the resonant capacitor Cr and two DC bulk capacitors C1 and C2 in series through D3. Because the input power line is series with L1, the input power line charges the resonant capacitor Cr and two DC bulk capacitors C1 and C2 through L1. Because the output voltage of bridge rectifier is less than the sum of voltage on two DC bulk capacitors, the charging current in L1 will decay. For the direct feed mode, each switching period can be divided as two intervals. During the first interval, the input power line will directly feed the energy to the load and store the energy in L1. During the second interval, the input power line will charge the resonant capacitor Cr and two DC bulk capacitors through C_Inductor's winding L1 and D3.

2. Couple Boost Mode:

In the couple boost mode, the input AC voltage is lower than the voltage on each DC bulk capacitor. Because the input AC voltage is lower than the voltage of each DC bulk capacitor, as the load current is changed from zero to a fixed value, the resonant capacitor Cr releases the stored energy and the voltage on Cr decreases. As the voltage on Cr is less than the voltage of the two DC bulk capacitors, the two DC bulk capacitors C1 and C2 will release the stored energy to the load and the resonant capacitor Cr in parallel. The current passes through windings L2 and L3 of the coupled inductor C_Inductor. Energy is stored in the coupled inductor C_Inductor windings. It is coupled inductor C_Inductor that resonates with the resonant capacitor Cr.

As the load current changes from the fixed value down to zero, the coupled inductor windings L2 and L3 continue keep to resonate with Cr. The voltage on Cr increases. As the coupled inductor winding L1's reflected voltage is lower than two windings L2 and L3's reflected voltages diodes D1 and D2 turn off and the stored magnetic energy in the coupled inductor is transferred from the windings L2 and L3 to the winding L1. The coupled inductor C_Inductor will release the stored magnetic energy to the resonant capacitor Cr and bulk DC capacitors C1 and C2 through C_Inductor's winding L1. And at the same time, the input power line will also release or feed energy to the resonant capacitor Cr and bulk DC capacitors C1 and C2. In the couple boost mode, each switching period can also be divided as three intervals. During the first interval, two DC bulk capacitors C1 and C2 release the stored energy to the load and store the energy in C_Inductor windings L2 and L3. During the second interval, the windings L2 and L3 resonate with the resonant capacitor Cr to transfer the stored magnetic energy from the windings L2 and L3 to the winding L1. During the third interval, the coupled inductor's stored energy and the input power line will charge the resonant capacitor Cr and bulk DC capacitors C1 and C2 through the couple inductor C_Inductor's winding L1.

Because the input power line always feeds energy to the converter the problem of the input current during the 60 degree dead-time near the zero line crossings can be solved. Because the currents in the branches of D1 and D2 are discontinuous, it is possible to use a high frequency coupled inductor coupled to a unipolar high frequency current source output having an instant current that varies from a fixed value to zero. There is current through D1 and D2 only during the 60 degree dead time, and the couple boost mode automatically works during that period to shape the input current. The circuit's circulating current is low. It is the L1's winding current that can be used to absorb the Input energy from the power line as the instantaneous output voltage of the rectifier is lower than that of C1 or C2.

Figure 9:
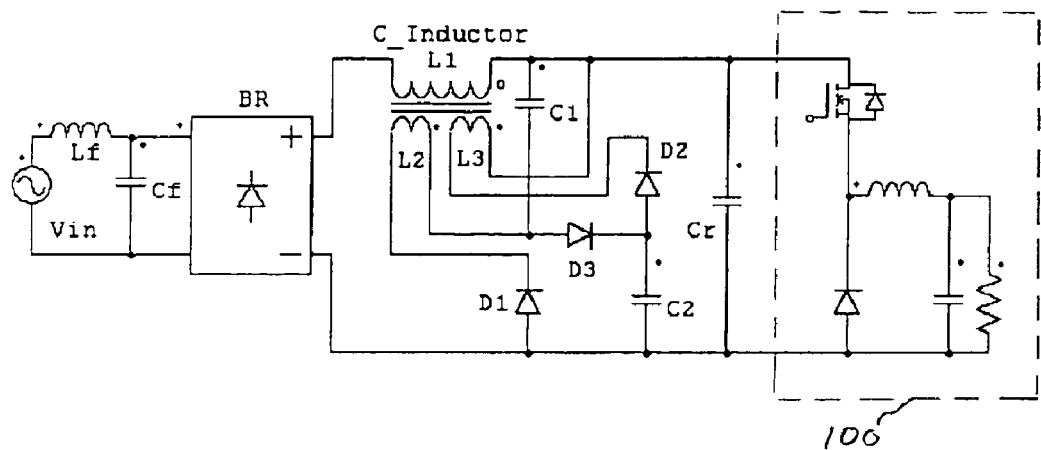
FIG. 9 illustrates an electrical circuit diagram of a second embodiment of the present invention, showing a single phase high power factor correction converter with discontinues current input buck converter.

A second embodiment of the present invention is illustrated in FIG. 9. In this embodiment, a buck circuit 100 is provided as a following power stage, in which the buck circuit works in a continuous or discontinues current mode.

Figure 10:
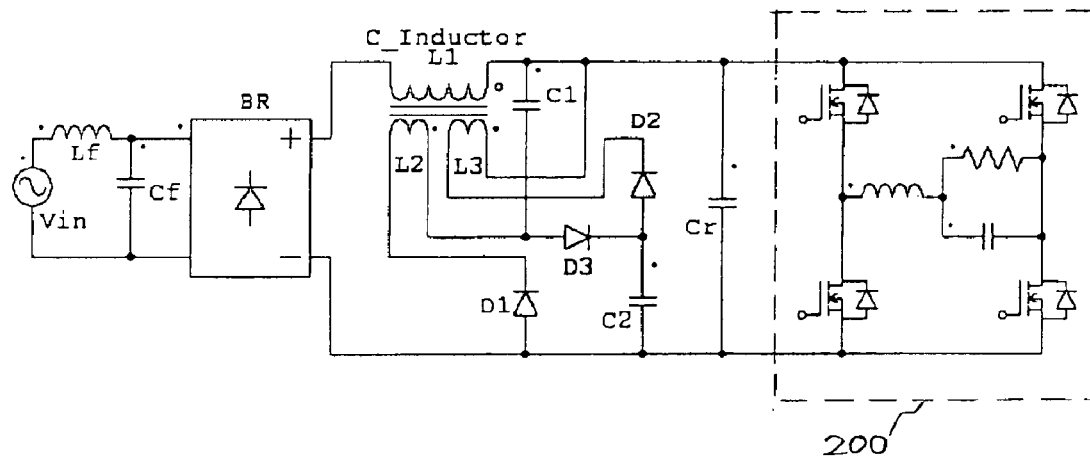
FIG. 10 illustrates an electrical circuit diagram of a third embodiment of the present invention, showing a single phase high power factor correction converter with discontinues current input full bridge inverter.

FIG. 10 illustrates a third embodiment of the present invention. In this embodiment, a discharge lamp, such as, for example, a high intensity discharge (HID) lamp is driven by the PFC converter. A full bridge inverter 200 outputs a low frequency square AC current source.

Figure 11:
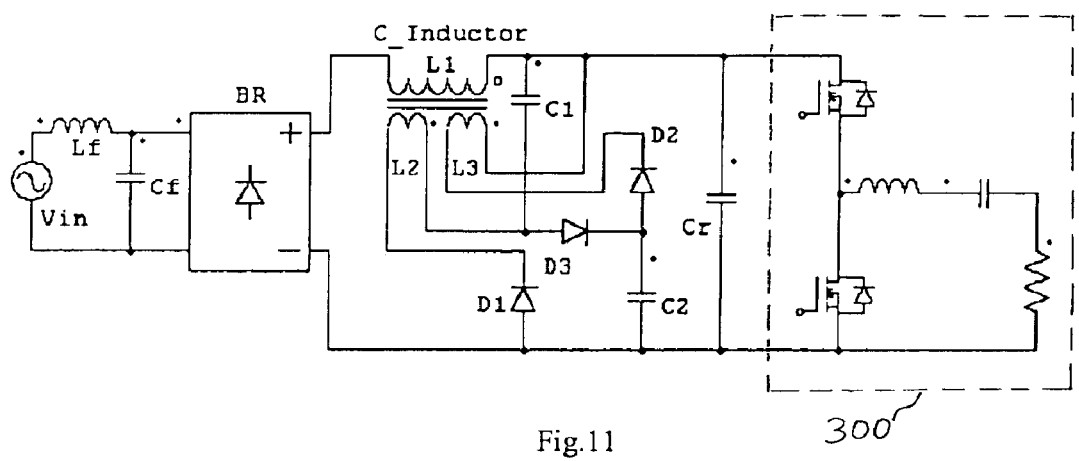
FIG. 11 illustrates an electrical circuit diagram of a fourth embodiment of the present invention, showing a single phase high power factor correction converter with discontinues current input half bridge inverter.
Figure 12:
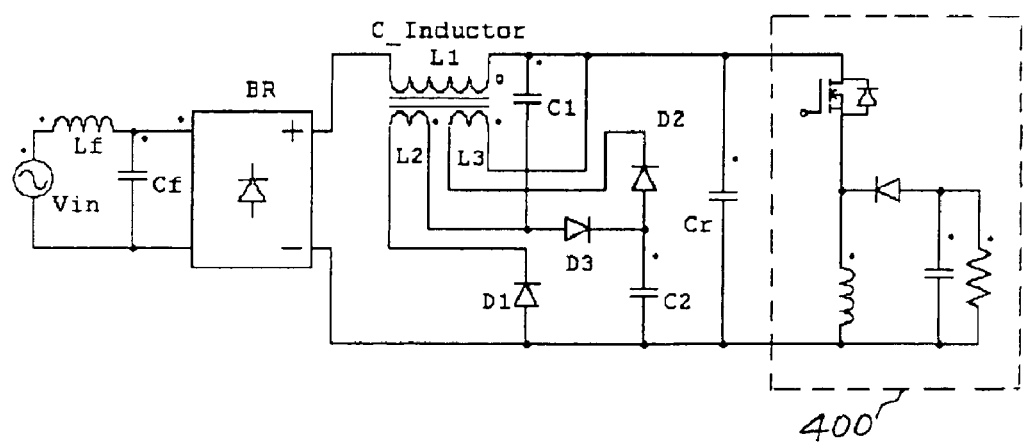
FIG. 12 illustrates an electrical circuit diagram of a fifth embodiment of the present invention, showing a single phase high power factor correction converter with discontinues current input buck-boost converter.
Figure 13:
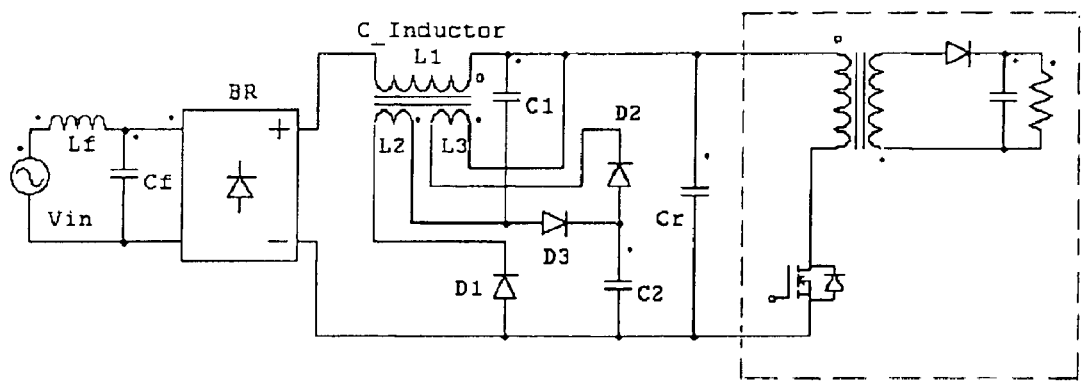
FIG. 13 illustrates an electrical circuit diagram of a sixth embodiment of the present invention, showing a single phase high power factor correction converter with discontinues current input Flyback converter.
Figure 14:
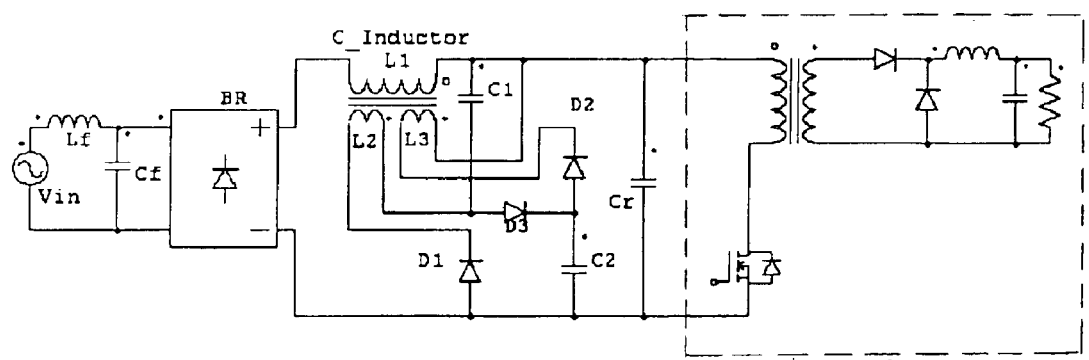
FIG. 14 illustrates an electrical circuit diagram of a seventh embodiment of the present invention, showing a single phase high power factor correction converter with discontinues current input forward converter.
Figure 15:
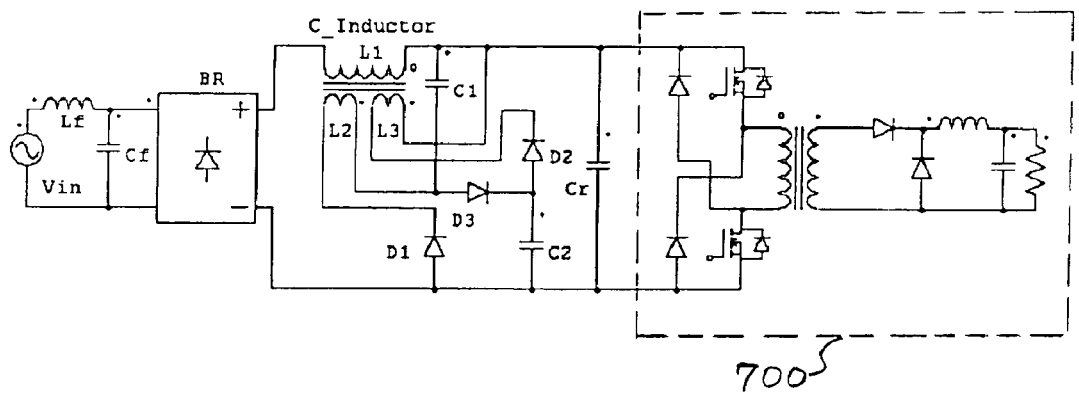
FIG. 15 illustrates an electrical circuit diagram of a eighth embodiment of the present invention, showing a single phase high power factor correction converter with discontinues current input two switches forward converter.
Figure 16:
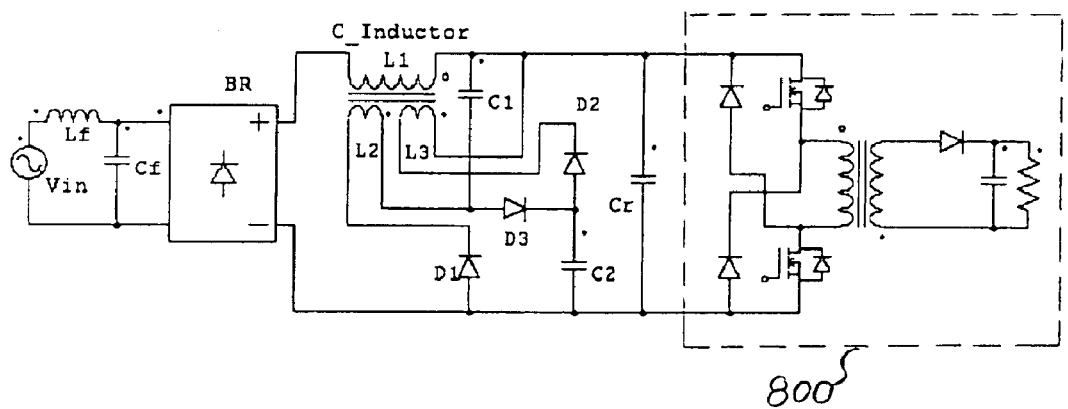
FIG. 16 illustrates an electrical circuit diagram of a ninth embodiment of the present invention, showing a single phase high power factor correction converter with discontinues current input two switches flyback converter.
Figure 17:
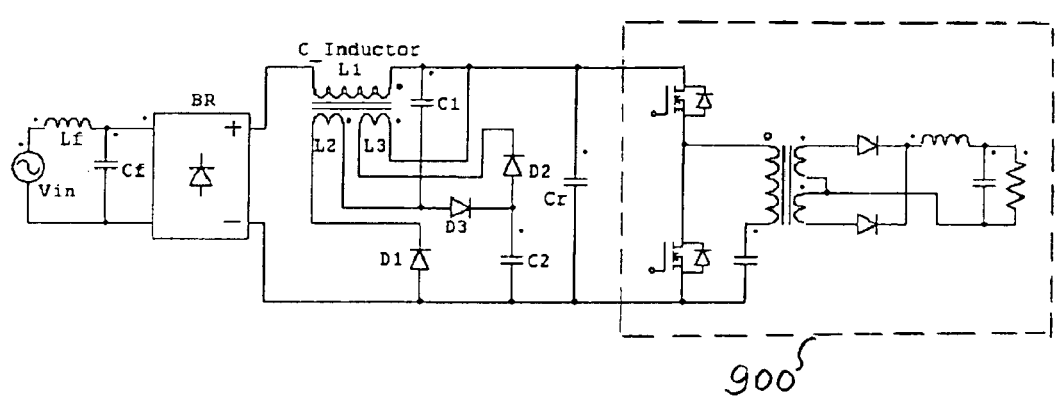
FIG. 17 illustrates an electrical circuit diagram of a tenth embodiment of the present invention, showing a single phase high power factor correction converter with discontinues current input half bridge DC-DC converter.
Figure 18:
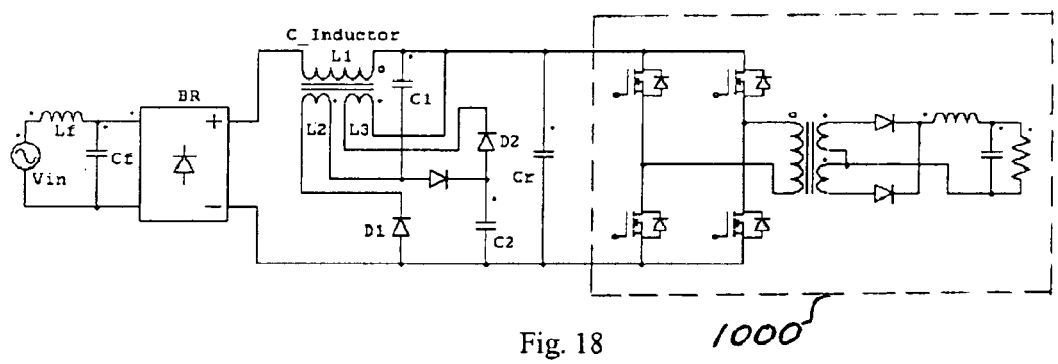
FIG. 18 illustrates an electrical circuit diagram of a eleventh embodiment of the present invention, showing a single phase high power factor correction converter with discontinues current input full bridge DC-DC converter.
Figure 19:
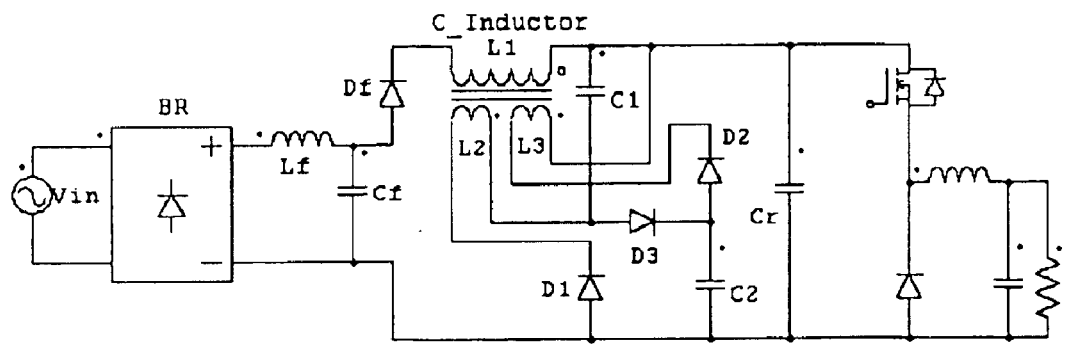
FIGS. 19 to 28 illustrate the modified topologies shown in FIG. 9 to FIG. 18, that is, the low pass filters are shifted from AC side to DC side.
Figure 20:
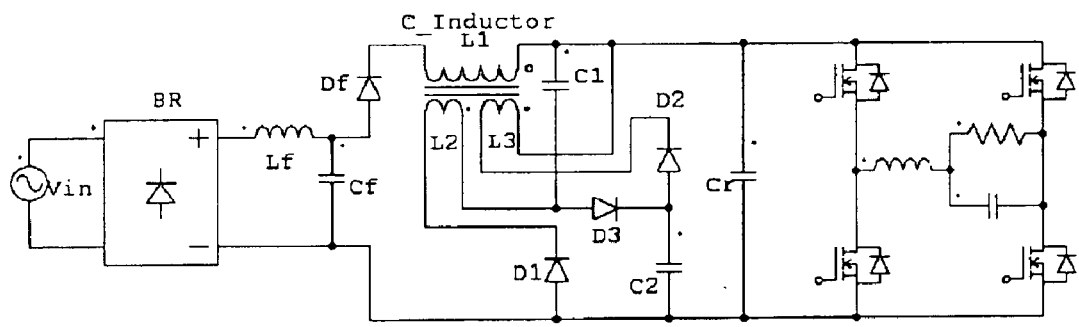
Figure 21:
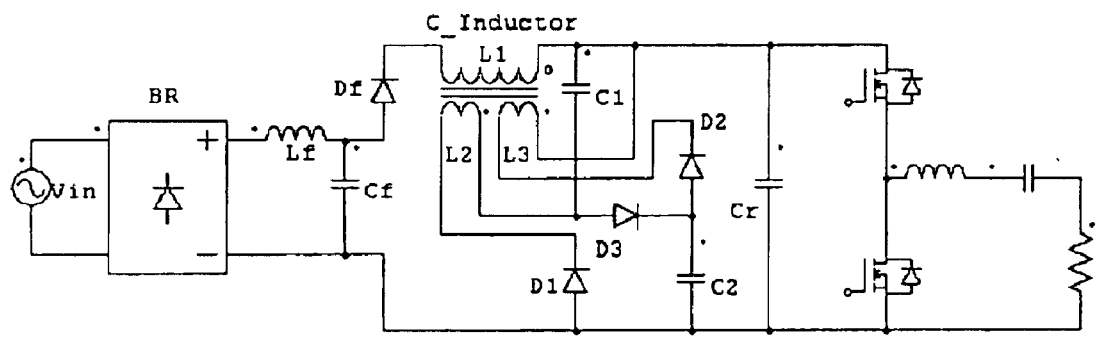
Figure 22:
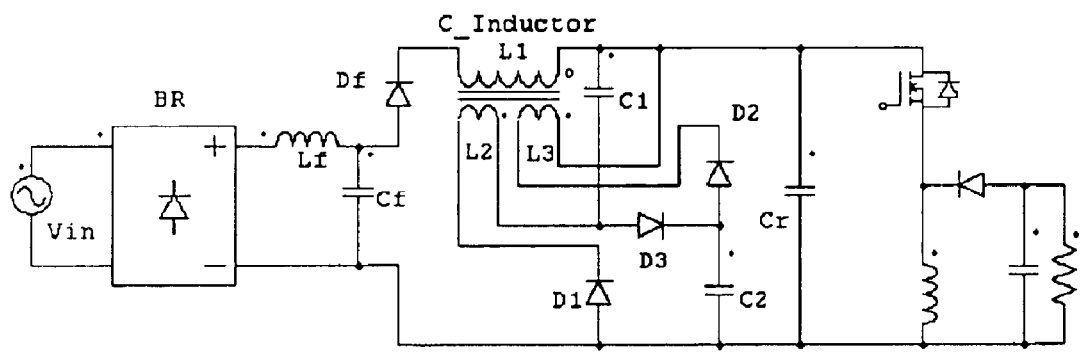
Figure 23:
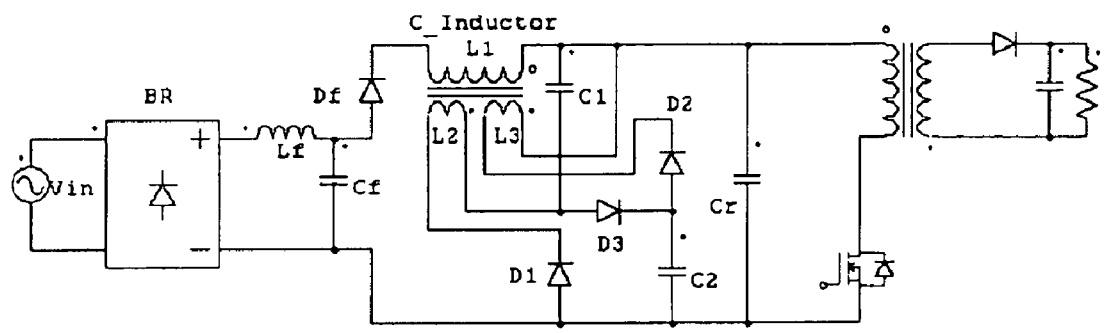
Figure 24:
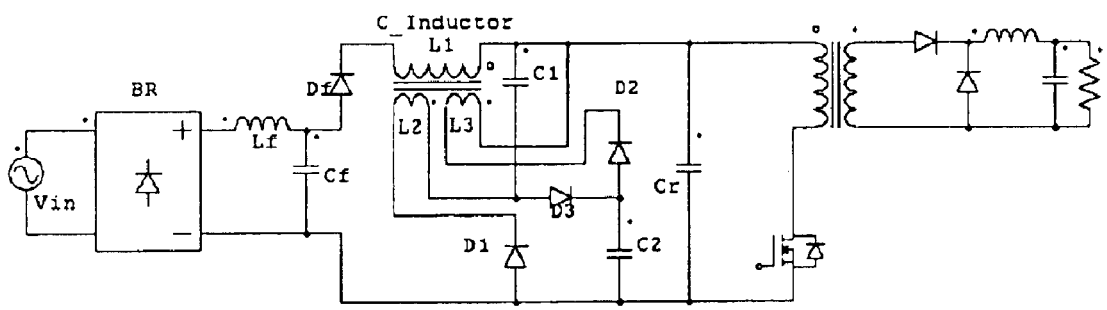
Figure 25:
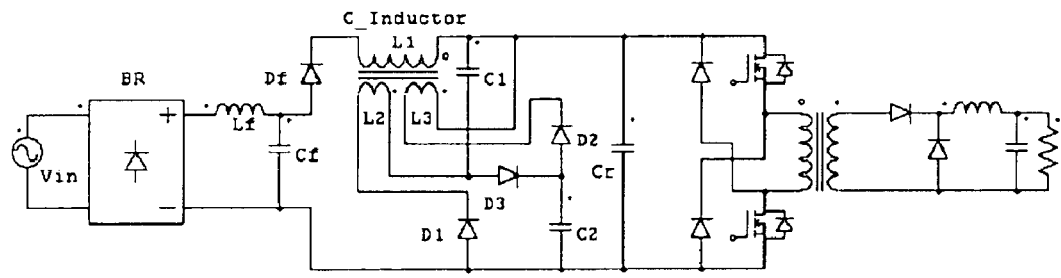
Figure 26:
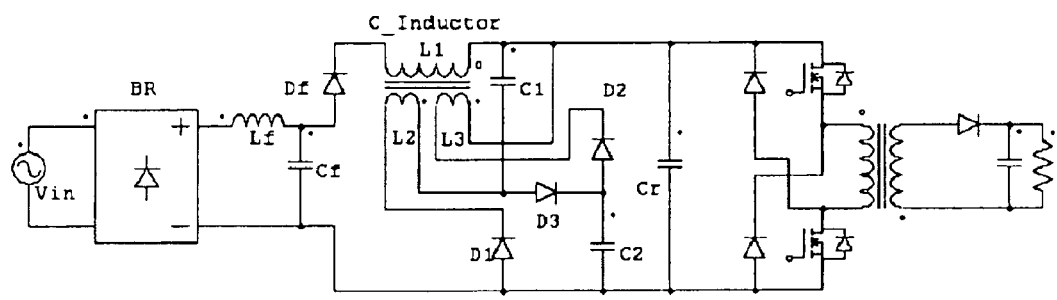
Figure 27:
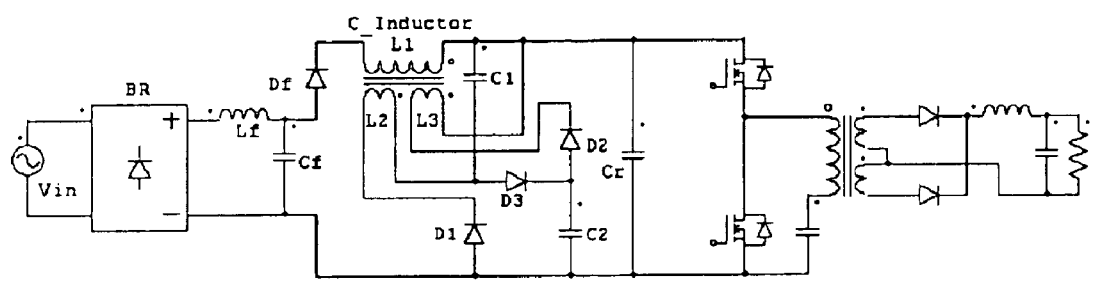
Figure 28:
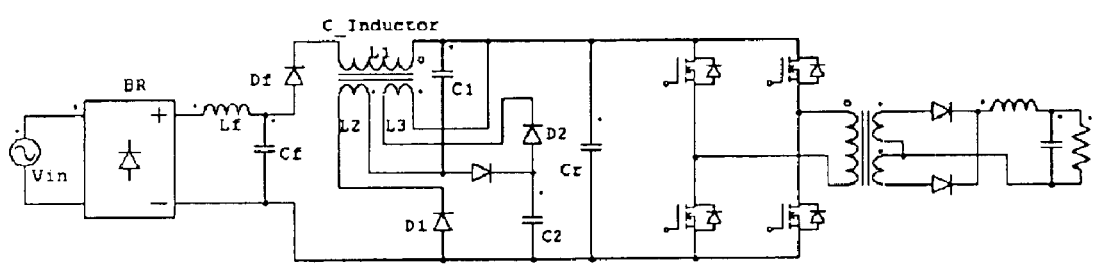
Figure 29A:
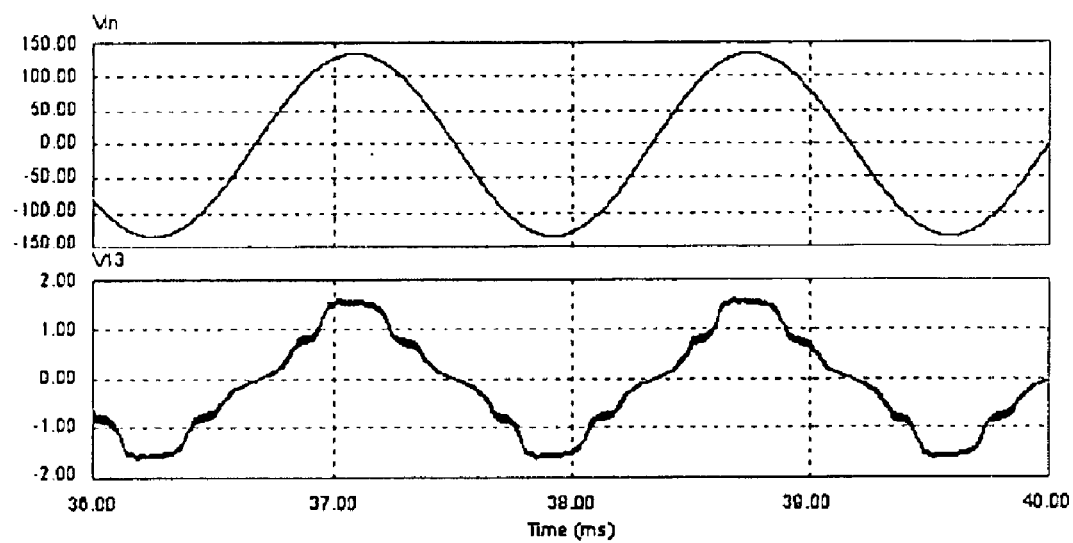
FIG. 29A illustrates simulation waveforms of input line voltage and current associated with a Flyback converter employed in the embodiment of FIG. 13
Figure 29B:
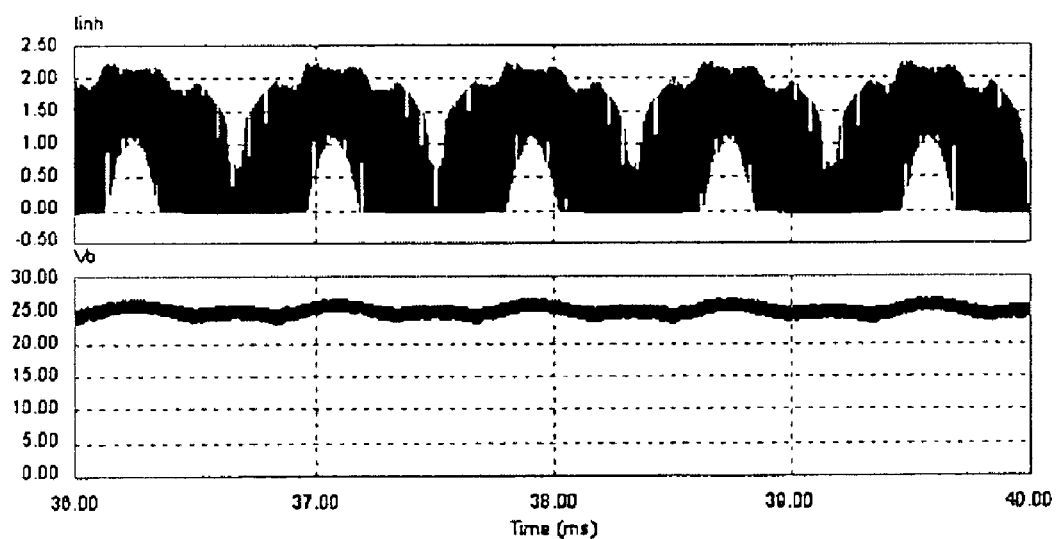
FIG. 29B illustrates simulation waveforms of coupled inductor L1 current and the output voltage associated with a Flyback converter employed in the embodiment of FIG. 13.
Figure 30:
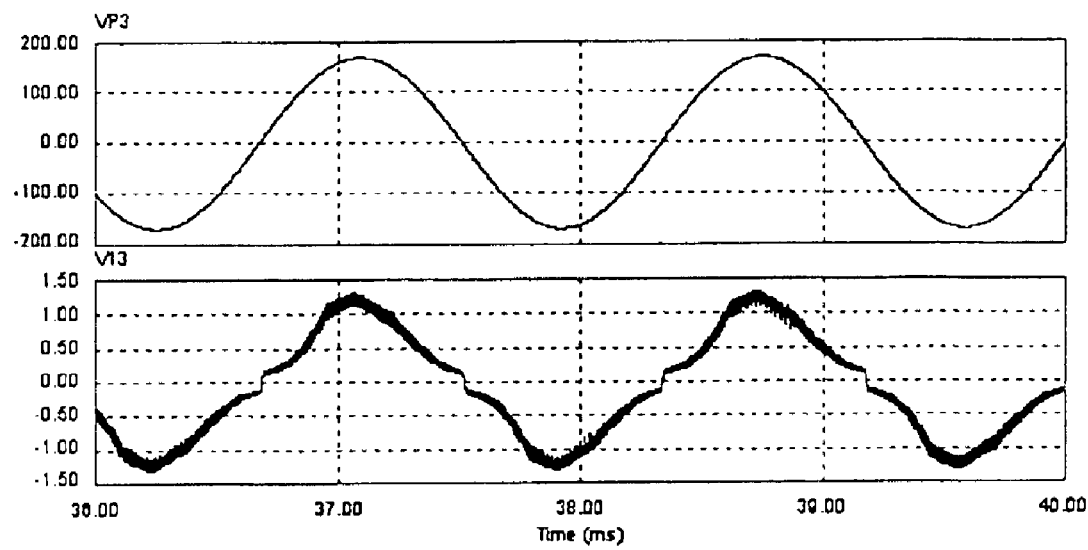
FIG. 30A illustrates simulation waveforms of input line voltage and current associated with a Forward converter employed in the embodiment of FIG. 14
FIG. 30B illustrates simulation waveforms of coupled inductor L1 current and the output voltage associated with a Forward converter employed in the embodiment of FIG. 14.
Figure 30:
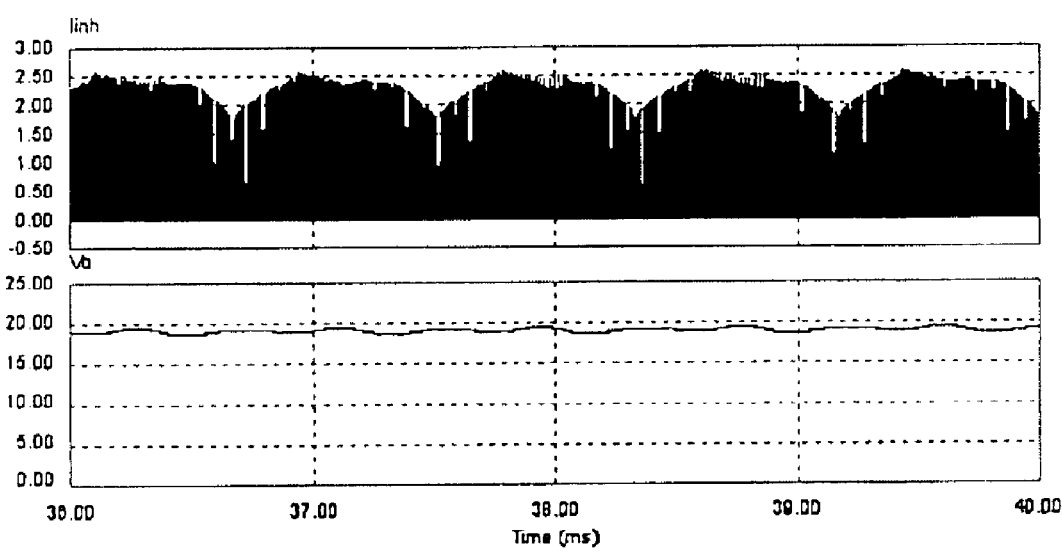

FIG. 11 illustrates a fourth embodiment of the present invention. In this embodiment, a half bridge 300 is employed (used) to drive the discharge lamp, such as, for example, a fluorescent lamp, with a high frequency sinusoidal AC current.

FIGS. 12 to 18 illustrate the fifth, sixth, seventh, eighth, ninth, tenth and eleventh embodiments of the present invention. In the fifth embodiment (FIG. 12), the PFC converter is interfaced to a discontinues current input buck-boost converter 400. The sixth embodiment (FIG. 13) illustrates the PFC converter of the present invention being interfaced to a discontinues current input flyback converter 500. The seventh embodiment (FIG. 14) illustrates the PFC converter of the present invention being interfaced to a discontinues current input forward converter 600. The eighth embodiment (FIG. 15) illustrates the PFC converter of the present invention being interfaced to a two-switch forward converter 700. The ninth embodiment (FIG. 16) illustrates the PFC converter of the present invention being interfaced to a two-switch flyback converter 800. The tenth embodiment (FIG. 17) illustrates the PFC converter of the present invention being interfaced to a half-bridge DC-DC converter 900. The eleventh embodiment (FIG. 18) illustrates the PFC converter of the present invention being interfaced to a full-bridge DC-DC converter 1000.

FIGS. 19 to 28 illustrate the modified topologies shown in FIG. 9 to FIG. 18, that is, the low pass filters are shifted from AC side to DC side. As the low pass filters are shifted from AC side to DC side, the diode Df is inserted to make the current in L1 unipolar. The benefit of low pass filter in DC side is that the rectifier can be low speed.

Figure 31:
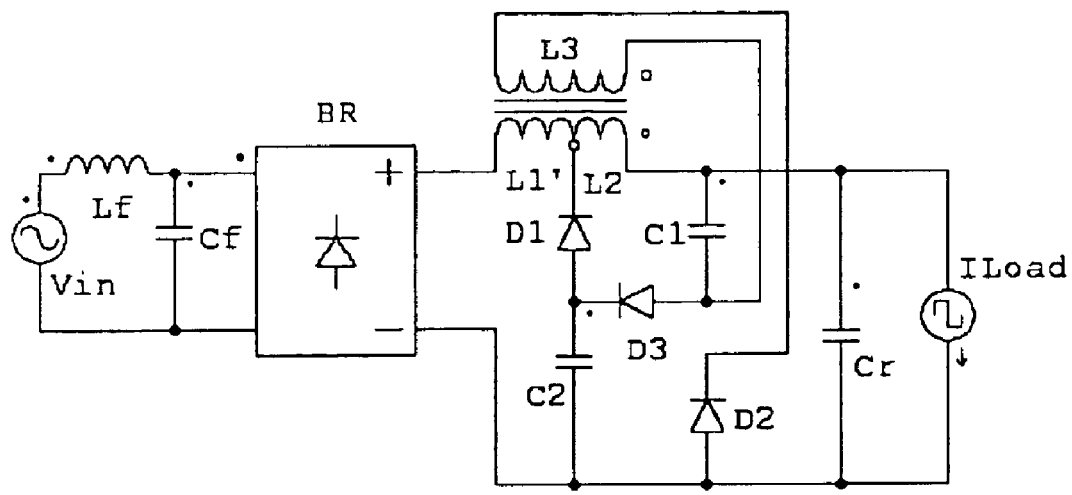
FIG. 31 illustrates a modified topology of FIG. 8.

FIG. 31 illustrates the modified topology for the topology shown in FIG. 8. The operation concept is the same. The difference of two topologies is the multi-winding couple inductor C_Inductor. In FIG. 8, the couple inductor has three separated windings. In FIG. 31, the couple inductor has two separated windings but one winding has a tapping. For two windings couple inductor, the couple coefficiency can be higher and the manufacture cost can be lower. All circuits shown in FIG. 9 to FIG. 18 can use the circuit shown in FIG. 31 for power factor correction function.

Figure 32:
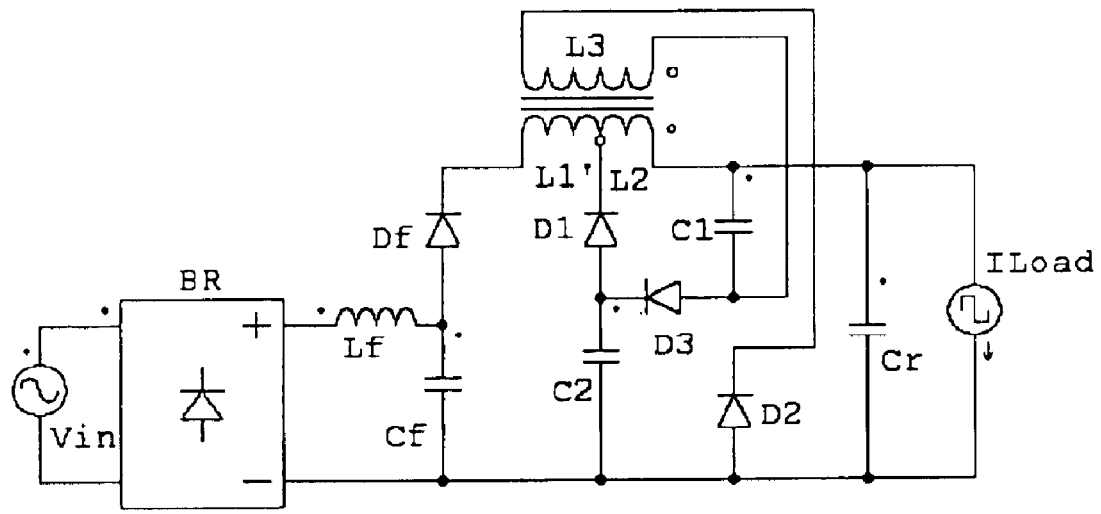
FIG. 32 illustrates a modified topology of FIG. 8, but the low pass filter is shifted from AC side to DC side

FIG. 32 illustrates the modified topologies shown in FIG. 8, that is, the low pass filters are shifted from AC side to DC side. As the low pass filter is shifted from AC side to DC side, the diode Df is inserted to make the current in L1 unipolar. All circuits shown in FIG. 19 to FIG. 28 can use the circuit shown in FIG. 32 for power factor correction function.

The present invention provides several significant improvements over prior art devices. The PFC converter of the present invention provides an improved PFC function, as compared to prior art. The present invention does not impose any additional current or voltage stresses on the switches. In addition, the improved valley-fill power stage of the instant invention is passive and fewer additional components. As a result, the efficiency and reliability of the PFC stage of the present invention is very high and the manufacture cost is low.

What is claimed is:

1. A switching power supply comprising:
   an AC-DC converter for converting an AC input line voltage to an output DC voltage;
   an energy storage device that stores a DC voltage that is lower than a peak value of the AC input line voltage, the DC voltage stored in the energy storage device being released to a load during a period when a rectified AC input line voltage is lower than the DC voltage, the rectified AC input line voltage being directly fed to the load and the energy storage device when the rectified AC input line voltage is higher than the DC voltage; and
   a passive auxiliary power factor corrector that operates, after the release of the DC voltage stored in the energy storage device, to shape an AC input line current during the period.

2. The switching power supply of claim 1, wherein the energy storage device is operable to receive continuous or high frequency discontinuous current and release a high frequency discontinuous current or a series of pulses.

3. The switching power supply of claim 1, wherein the passive auxiliary power factor corrector comprises a current energy storage device and the energy storage device comprises a valley fill power factor correction circuit.

4. The switching power supply of claim 3, wherein the current energy storage device comprises a coupled inductor coupled in series between the AC-DC converter and at least one leg of the valley fill power factor correction circuit.

5. The switching power supply of claim 3, wherein the coupled inductor comprises a multi-winding coupled inductor.

6. The switching power supply of claim 1, wherein the passive auxiliary power factor corrector further comprises a resonant capacitor coupled in parallel to the AC-DC converter.

7. The switching power supply of claim 1, wherein the passive auxiliary power factor corrector is operable to limit a current slew rate of the AC-DC converter.

8. The switching power supply of claim 1, wherein the load comprises a discontinuous current input DC to DC or DC to AC converter.

9. An auxiliary power factor correction circuit comprising:
   an inductor circuit coupled in series to at least one leg of a valley-fill power factor correction circuit for shaping an input AC line current during a predetermined period proximate a zero line crossing point of the input AC line voltage and for reducing an input AC line current pulsating line voltage.

10. The auxiliary power factor correction circuit of claim 9, wherein the inductor circuit comprises a coupled inductor in series with a resonant capacitor.

11. The auxiliary power factor correction circuit of claim 10, wherein the coupled inductor comprises a multi-winding inductor.

* * * * *